United States Patent

Arumugham et al.

[15] 3,670,095

[45] June 13, 1972

[54] CATHODE RAY TUBE "SET-UP" CIRCUITRY

[72] Inventors: Rangaswamy Arumugham, Oakfield; Robert Charles Wheeler, Elba, both of N.Y.

[73] Assignee: Sylvania Electric Products, Inc.

[22] Filed: Oct. 30, 1970

[21] Appl. No.: 85,462

[52] U.S. Cl. ..................178/5.4 R, 178/5.4 TE, 178/5.4 MA
[51] Int. Cl. ..........................................................H04n 9/20
[58] Field of Search ......................178/5.4 R, 5.4 TE, 5.4 MA

[56] References Cited

UNITED STATES PATENTS 3,586,766 6/1971 Heuer et al. .......................178/5.4 TE

*Primary Examiner*—Robert L. Richardson
*Attorney*—Norman J. O'Malley, Robert E. Walrath and Thomas H. Buffton

[57] ABSTRACT

Control circuit apparatus for effecting "set-up" of a color cathode ray tube in a color television receiver includes a first switching means for selectively coupling and decoupling a magnitude alterable video signal source and a plurality of parallel connected "null" circuit arms each having an alterable impedance which, in turn, is coupled to circuitry having an electron device coupled to an impedance with the electron device coupled to a potential source, a chrominance signal source, and a cathode electrode of the cathode ray tube and the impedance coupled to a potential reference level. The circuitry is "bridge-like" in operation inhibiting current flow through the "null" circuits at "black level" setting of the video signal source and at a "service" position or decoupling of the video signal source.

7 Claims, 1 Drawing Figure

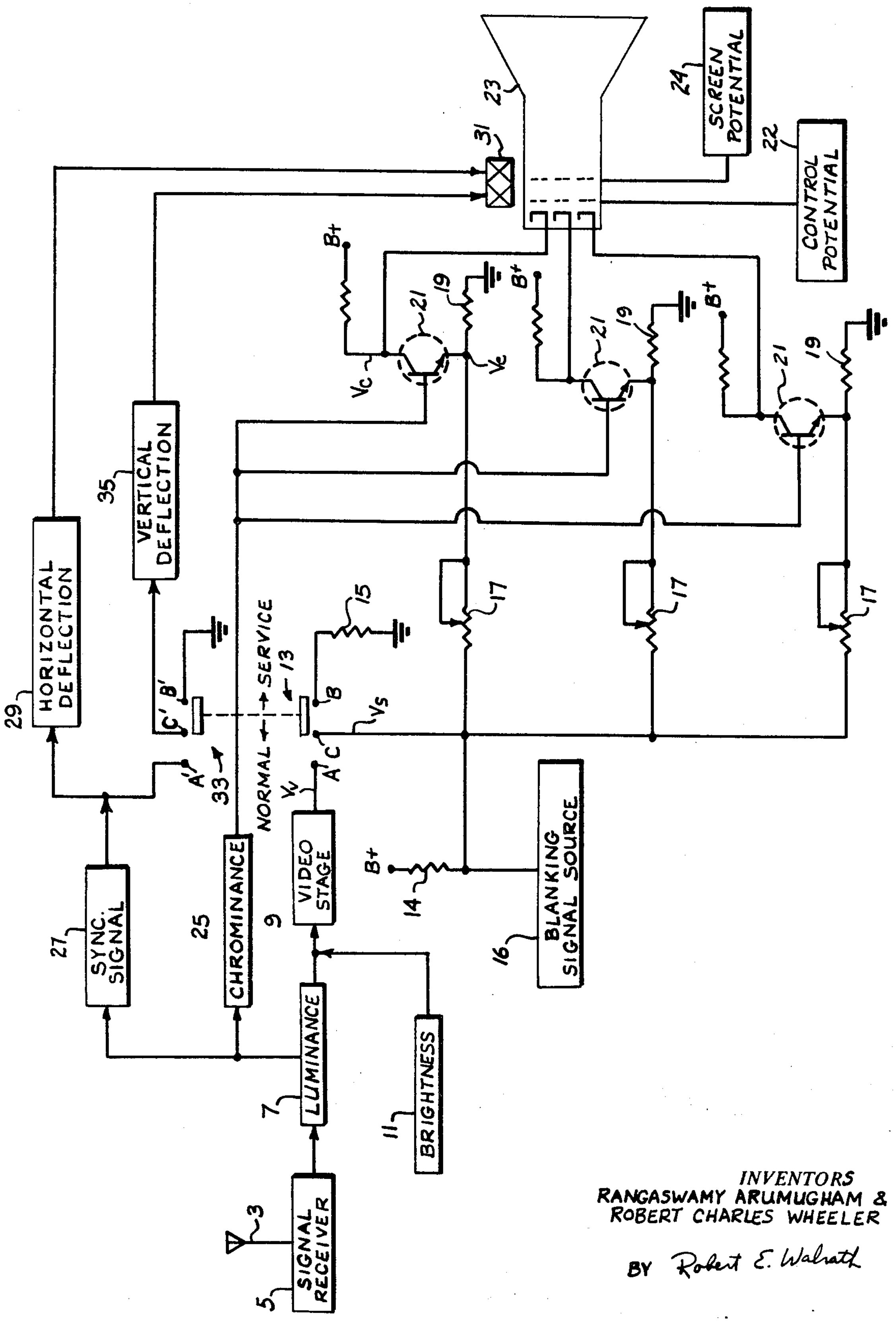
INVENTORS
RANGASWAMY ARUMUGHAM &
ROBERT CHARLES WHEELER
BY Robert E. Walrath

CATHODE RAY TUBE "SET-UP" CIRCUITRY

BACKGROUND OF THE INVENTION

Present-day color television receivers normally employ a multi-gun color cathode ray tube with each one of the electron guns providing an electron beam. The cathode ray tube also utilizes a screen or surface having a plurality of phosphor areas which are impinged by the electron beams in a manner well known in the art. Moreover, the electron guns, the electron beams, and the phosphor areas all vary with respect to one another in each manufactured cathode ray tube. Such variations necessitate what is usually referred to as "setting-up" or adjusting the color cathode ray tube to achieve optimum operation.

One well-known system for effecting "set-up" of a color cathode ray tube in a color television receiver is disclosed in U.S. Pat. No. 3,144,794 issued to J. Stark, Jr. et al., on Dec. 17, 1963. Therein, a first switch is employed to couple and decouple a video signal source available from the plate circuit of an electron tube and a D.C. potential source to a pair of alterable resistors connected to the cathodes of a color cathode ray tube. Also, a second switch enables and disables vertical scanning of the electron beams of the color cathode ray tube.

Another known system for effecting "set-up" of a color cathode ray tube is disclosed in an article entitled "A Semi conductor Video Output Amplifier For A Red Blue Green Large Screen Television Receiver" by Dwight J. Poppy and appearing in the IEEE Transactions on TV Receivers issued July 1969. Therein, a plurality of transistor circuits are coupled by a resistor divider network and voltage feedback system to the cathodes of a color cathode ray tube. Also, first and second switching means are employed in a manner substantially as mentioned above.

Although both techniques have been and still are widely employed, it has been found that each leaves something to be desired. For example, employment of fixed and adjustable controls in the output drive circuitry coupled to the cathode ray tube requires components having relatively high voltage and relatively high power rating capabilities. Obviously, such components are relatively expensive as compared with lower voltage and power rated components. Moreover, relatively high voltage and power ratings are accompanied by increased probabilities of value change and undesired arcing wherein catastrophic failures are encountered.

Further, it has been found that systems wherein the drive adjustments are directly coupled to the cathodes of the cathode ray tube, impedances of substantially equal magnitude are required if a balanced delay and a balanced color system is to be achieved. Thus, balancing resistors are normally employed which undesirably raises the cost of the system. Moreover, the above-described systems control cathode current flow in the output rather than the input circuitry of a drive system which is power consuming and expensive.

OBJECTS AND SUMMARY OF THE INVENTION

An object of the present invention is to provide enhanced control circuitry for effecting "set-up" of a color cathode ray tube. Another object of the invention is to provide improved circuitry for controlling input signals of relatively small magnitude to effect a color cathode ray tube "set-up" system. A further object of the invention is to provide control circuitry having a "null" system wherein cut off of a color cathode ray tube is substantially unaffected by color temperature adjustments.

These and other objects, advantages and capabilities are achieved in one aspect of the invention by control circuit apparatus which includes a first switching means having a contact for selectively coupling and decoupling an alterable video signal source to a plurality of parallel connected "null" arm circuits each having an adjustable impedance and coupled to the junction of an electron device and an impedance whereat is developed a potential substantially equal to the potential appearing at the contact of the first switching means under "-black level" conditions and "service" conditions. A second switch cooperates with the first switching means to enable and disable vertical scanning.

BRIEF DESCRIPTION OF THE DRAWING

The sole FIGURE illustrates, in block and schematic form, a preferred form of control apparatus for effecting "set-up" of a color cathode ray tube.

DESCRIPTION OF THE PREFERRED EMBODIMENT

For a better understanding of the present invention, together with other objects, advantages and capabilities thereof, reference is made to the following description in conjunction with the attached drawing and appended claims.

Referring to the drawing, a color television receiver includes an antenna 3 for intercepting and applying color television signals to a signal receiver 5. The receiver 5 includes the usual RF and IF amplifier and detector stages and provides a composite color signal which is applied to a luminance channel 7. In turn, the luminance channel 7 amplifies the luminous portion of a video signal which is applied to a video stage 9 at a DC level which is controlled by a brightness control 11 coupled to the video stage 9.

A first switching means 13 has a first contact A coupled to the magnitude alterable video stage 9 and a second contact B coupled by way of a first impedance 15 to circuit ground. A third contact C is coupled via a resistor 14 to a potential source B+, to a blanking signal source 16, and to adjustable impedances 17 in a plurality of parallel coupled "null" circuits. The opposite end of each of the adjustable impedances 17 is coupled to a junction of a second circuit branch which includes a second impedance 19 coupled to an electron device 21. The second impedance 19 is coupled to a potential reference level and the electron device 21 has an output circuit coupled to a cathode electrode of an electron gun of the cathode ray tube 23, a first input circuit coupled to the chrominance channel 25 and a second input circuit coupled to the adjustable impedance 17 and the second impedance 19. Also, the color cathode ray tube 23 includes the usual control and screen grid electrodes with associated control and screen grid potential adjustable circuitry, 22 and 24 respectively.

In a normal manner, the luminance channel 7 provides output signals which are applied to the chrominance channel 25 wherein are developed color signals representative of the colors red, green, and blue. These color signals are, in turn, applied to a first input circuit of the electron devices 21.

The luminance channel 7 also provides output signals which include synchronizing information and are applied to a synchronizing signal separation circuit 27. Therein, signals representative of horizontal and vertical synchronizing information are derived. The horizontal synchronizing signals are applied to a horizontal deflection stage 29 wherefrom signals for effecting electron beam scanning in a horizontal direction are derived and applied to deflection apparatus 31 associated with the color cathode ray tube 23.

The vertical synchronizing signals are applied to a contact A′ of a second switch 33. A second contact B′ of the second switch 33 is connected to a potential reference level such as circuit ground and a third contact C′ is coupled to a vertical deflection stage 35 wherefrom signals for effecting electron beam deflection in a vertical direction are applied to deflection apparatus 31 associated with the color cathode ray tube 23. Moreover, the second switch 33 is cooperatively associated with the first switch 13.

It should perhaps be noted that each of the electron guns of the cathode ray tube must be adjusted to a given cut-off condition and to a given color temperature condition. Preferably, these cut-off and color temperature adjustments are achieved without deleterious effect upon each other. In other words, color temperature adjustments do not affect the cut-off conditions nor do the cut-off adjustments affect the color temperature conditions.

As to operation, the second impedance 19 is of a chosen value such that a given potential Ve is developed at the emitter of the electron device 21. The series connected second impedance 19 and electron device 21 intermediate the potential source B+ and the potential reference level provide the desired potential Ve which is applied to one end of the adjustable impedance 17.

Positionally locating the first switch means 13 in the "service" position interconnects the second and third contacts, B and C, and forms a voltage divider of series connected resistors 14 and 15 intermediate the potential source B+ and the potential reference level. These resistors 14 and 15 are of a value such that a potential Vs, which is substantially equal to the potential Ve, is available at the contact C of the first switching means 13. This potential Vs is applied to the other end of the adjustable impedance 17 rendering substantially equal potentials applied to opposite ends thereof and inhibiting current flow therethrough. Thus, the adjustable impedance 17 is ineffectual insofar as alterations of the electron device 21 are concerned during the "service" period when cut-off conditions of the cathode ray tube 23 are established.

Moreover, it should perhaps be noted that the voltage divider circuitry which includes resistors 14 and 15 becomes necessary due to the addition of signals from the blanking signal source 16. Should the blanking signals be introduced elsewhere, it is obvious that contact B could be disconnected whereupon the circuit would not have a return path and a potential Ve would also appear at the contact C of the first switching means 13 and current flow through the adjustable impedance 17 would be similarly inhibited.

Further, the brightness control 11 is employed to provide an output potential Vv at the video stage 9 at a "black level" condition which is substantially equal to the given potential Ve developed at the junction of the impedance 19 and the electron device 21. Thus, shifting the first switching means 13 to the "normal" position interconnects contacts A and C whereupon the potentials Vv and Ve are applied to the adjustable impedance 17 at a "black level" setting. Moreover, since these potentials Vv and Ve are substantially equal, the adjustable impedance 17 does not conduct and is ineffectual at the "black level" condition.

However, the output of the video stage 9 is altered when color temperature adjustment is desired. Thereupon, the potentials applied to the alterable impedance 17 are varied, current flows therethrough, and the impedances 17 serve to effect the desired color temperature adjustments. Thus, there is provided a "null" arm which includes the alterable impedance 17. Moreover, current flow through the "null" arm is inhibited whenever the first switching means 13 is positionally located in the "service" position or whenever the "normal" position is employed and the video stage 9 adjusted to a "-black level" setting.

As a brief review of the procedure, the first switching means is positionally located in the "service" position whereupon current flow through the adjustable impedance 17 is inhibited and the electron guns are adjusted to a cut-off condition by the control grid and screen grid adjustments 22 and 24. Then, the first switching means 13 is shifted to "normal" operation and the brightness 11 advanced to provide application to the alterable impedance 17 of a potential greater than the potential Ve applied to the opposite end thereof. Thereupon, current flows through the alterable impedance 17 which is adjusted to provide the desired color temperature of the color cathode ray tube 23.

Thus, there has been provided unique control circuitry for effecting "set-up" of a color cathode ray tube in a television receiver. The circuitry simplifies the operative manipulations necessary to a "set-up" operation by eliminating interaction of cut-off and drive controls when setting up a CRT for proper color balance and gray scale tracking. Moreover, the control circuitry controls low level video at input rather than relatively large output signals at the cathode ray tube input circuitry whereby a less expensive and less demanding component selection is possible.

While there has been shown and described what is at present considered the preferred embodiment of the present invention, it will be obvious to those skilled in the art that various changes and modifications may be made therein without departing from the invention as defined by the following claims.

We claim:

1. In a color television receiver employing a color cathode ray tube having a plurality of electron guns each providing an electron beam and having a cathode electrode, a magnitude alterable video signal source, a chrominance signal source, a potential source, and electron beam deflection means, control circuit apparatus comprising:
   - first circuit branch means including a first switching means for selective coupling of a contact to said potential source and to said magnitude alterable video signal source;
   - a plurality of "null" circuit means each coupled to said contact of said switching means and including an alterable impedance; and
   - a plurality of second circuit branch means each having a junction coupled to one of said "null" circuit means at an end of said alterable impedance opposite to said coupled contact, each of said junctions being coupled by an electron device to said potential source and to said chrominance signal source and to one of said cathode electrodes and by an impedance to a potential reference level whereby a potential is developed at each of said junctions which is substantially equal to a potential appearing at said contact for a "black level" setting of said video signal source thereby inhibiting current flow through said "null" circuit means.

2. The control circuit apparatus of claim 1 wherein is included a voltage divider means coupled intermediate said potential source and a potential reference level with said first switching means selectively disconnecting said contact from said video signal source means and to said voltage divider whereby a potential is applied to said contact having a value substantially equal to the potential developed at each junction of said second circuit branch means whereupon current flow through said alterable impedance of each of said "null" circuit means is inhibited.

3. The control circuit apparatus of claim 1 including a second switching means formed for cooperative action with said first switching means and coupled to said electron beam deflection means to effect enablement of electron beam scanning in a vertical direction upon selective coupling of said contact to said video signal source by said first switching means and disablement of electron beam scanning in a vertical direction upon disconnection of said contact and video signal source by said switching means.

4. The control circuit apparatus of claim 1 wherein each of said electron devices includes an output circuit coupled to a cathode electrode of an individual electron gun of a color cathode ray tube, a first input circuit coupled to said chrominance signal source, and a second input circuit coupled to one of said "null" arms having an alterable impedance therein whereby variation in said alterable impedance are applied to the signal input circuit of each of said electron devices.

5. Control circuit apparatus for a color television receiver having a color cathode ray tube with a plurality of electron guns each having a cathode electrode, a magnitude alterable video signal source, a chrominance signal source, a potential source, and means for deflection of electron beams from said electron guns in two normal directions comprising:
   - first switching means having a contact formed for selective connection to and disconnection from said potential source and said magnitude alterable video signal source;
   - a plurality of "null" arm means each having an alterable impedance and connected in parallel to said contact of said first switching means;
   - a plurality of circuit means each having an electron device with an output circuit coupled to said potential source and to a cathode electrode of one of said electron guns, a first input circuit coupled to said chrominance signal source, and a second input electrode coupled to one of said plurality of parallel connected "null" arms and to an impedance coupled to a potential reference level; and second switching means coupled to said means for deflection of electron beams from said electron guns in two normal directions and ganged to said first switching means for cooperative operation therewith to effect enablement and disablement of vertical deflection of said electron beams in accordance with connection to and disconnection from said video signal source of said contact of said first switching means.

6. The control circuit apparatus of claim 5 wherein said contact of said first switching means is coupled to said potential source and selectively connected to said video signal source and to an impedance coupled to a potential reference level.

7. The control circuit apparatus of claim 5 wherein the potential appearing at each of the plurality of impedance, "-null" arm, and electron device coupling is substantially equal to the potential appearing at said contact of said first switching means when said magnitude alterable video signal source is adjusted to a "black level" setting.

* * * * *

PO-1050
(5/69)

UNITED STATES PATENT OFFICE
CERTIFICATE OF CORRECTION

Patent No. 3,670,095 Dated June 13, 1972

Inventor(s) Rangaswamy Arumugham and Robert Charles Wheeler

It is certified that error appears in the above-identified patent and that said Letters Patent are hereby corrected as shown below:

Col. 1, Line 18 - "3,144,794" should read - - 3,114,794

Col. 4, Claim 3, line 52 - before "switching" insert - - first - - .

Signed and sealed this 31st day of October 1972.

(SEAL)
Attest:

EDWARD M.FLETCHER,JR.
Attesting Officer

ROBERT GOTTSCHALK
Commissioner of Patents